United States Patent [19]

Bieler et al.

[11] 4,218,486

[45] Aug. 19, 1980

[54] PROCESS FOR PACKAGING, COOLING AND STORING FOOD ITEMS

[75] Inventors: Anne C. Bieler, Greenville; Milton A. Howe, Spartanburg, both of S.C.

[73] Assignee: W. R. Grace & Co., Duncan, S.C.

[21] Appl. No.: 1,649

[22] Filed: Jan. 8, 1979

Related U.S. Application Data

[63] Continuation of Ser. No. 544,728, Jan. 28, 1975, abandoned.

[51] Int. Cl.$^2$ ................................................ A23L 3/10
[52] U.S. Cl. ...................................... 426/412; 53/127; 426/393; 426/410
[58] Field of Search ............... 426/127, 399, 400, 401, 426/405, 406, 393, 410, 412; 99/371, 359, 409; 53/440, 127; 366/147, 144, 220; 422/302

[56] References Cited

U.S. PATENT DOCUMENTS

| | | | |
|---|---|---|---|
| 1,591,645 | 7/1926 | Rafn | 426/405 |
| 1,709,175 | 4/1929 | Huygen | 99/371 |
| 2,517,542 | 8/1950 | Clifcorn | 426/405 |
| 2,817,593 | 12/1957 | Feebles | 426/406 |
| 2,926,094 | 2/1960 | Herbold | 426/405 |
| 3,019,113 | 1/1962 | Rooker | 426/399 |
| 3,446,636 | 5/1969 | Kraus | 426/405 |
| 3,464,835 | 9/1969 | Castro | 426/412 X |
| 3,480,451 | 11/1969 | Hardison | 426/406 |
| 3,544,337 | 12/1970 | Bundus | 426/639 |
| 3,544,341 | 12/1970 | Reimers | 426/405 |
| 3,607,312 | 9/1971 | Ready | 426/412 X |
| 3,966,980 | 6/1976 | McGuckian | 426/393 |

FOREIGN PATENT DOCUMENTS

| | | | |
|---|---|---|---|
| 1805987 | 5/1970 | Fed. Rep. of Germany | 426/405 |
| 322175 | 2/1972 | U.S.S.R. | 426/393 |

OTHER PUBLICATIONS

Proceedings of Technical Sessions at 47th 1/23–27/54, Annual Convention of Nat'l Canners Assoc.

*Primary Examiner*—Steven L. Weinstein
*Attorney, Agent, or Firm*—John J. Toney; William D. Lee, Jr.; John B. Hardaway

[57] ABSTRACT

In the preparation and storage of cooked, bulk packaged food in flexible receptacles, the quality of the food is increased, the cooking conditions are closely controlled, the growth of bacteria is restricted, and the storage time is increased by reducing the interior temperature of the food from its filling temperature of at least 180° F. to below 45° F. in less than a half hour. Said temperature reduction is preferably achieved by filling the receptacle so that the food therein is flowable or mobile and then tumbling the receptacle in a cooling medium so that the food flows or moves within the receptacle. After storage at 28° F. to 32° F., the food may be heated by tumbling the receptacle in a heating medium in order to bring the food quickly to serving temperature thereby avoiding overcooking.

6 Claims, No Drawings

PROCESS FOR PACKAGING, COOLING AND STORING FOOD ITEMS

This is a continuation, of application Ser. No. 544,728, filed Jan. 28, 1975, now abandoned.

FIELD OF THE INVENTION

This invention relates to a process for packaging and storing food items in bulk without freezing or canning the food. In particular, the invention relates to an improved method of quickly cooking and cooling the food and of quickly bringing the food to serving temperatures after cold storage.

BACKGROUND OF THE INVENTION

In the prior art, vacuum packaging of food products in flexible, pliable containers is taught in U.S. Pat. No. 2,623,826 issued on Dec. 30, 1952 to Sanford R. Grinstead, and the cooking of food products and their storage in plastic containers is taught in U.S. Pat. No. 3,262,787 issued on July 26, 1966 to E. D. Ellis. Also, in U.S. Pat. No. 3,607,312 issued on Sept. 21, 1971 to C. A. Ready there is taught a method of preparing and preserving ready-to-eat food by vacuum packaging the food in a gas-tight pouch, cooking the food in the pouch by immersing it in hot water, rapidly chilling the food to about 30° F. but not freezing it, storing the food at 30° F. until needed for consumption, and heating it in hot water to serving temperatures. However, in each of the heretofore used methods of cooking and cooling packaged food it has been found that for bulk packages of food of ten pounds or more that, depending upon the food item packaged, up to four hours or more is required to cook and cool the contents of the bulk package; and, after cold storage, a correspondingly long period of time was required to heat the food item up to serving temperatures. Accordingly, it is one object of the present invention to provide a method of reducing the time for cooking, cooling, and reheating bulk packaged food items.

Also in the prior art, methods have been devised to aid in quickly cooking or cooling a food product by flowing gas or liquid therearound. Two such prior art methods are shown in U.S. Pat. No. 3,304,689 issued on Feb. 21, 1967 to H. G. Reichel and in U.S. Pat. No. 3,092,975 issued on June 11, 1963 to R. S. Zebarth. However, these prior art methods are employed with relatively rigid products or packages which do not have a means to improve heat transfer from the interior of the product. Accordingly, it is another object of the present invention to provide a method of increasing the heat transfer to and from the interior of bulk food products packaged for storage.

A further object of the present invention is to provide a method for quickly chilling bulk packaged food from its cooking and packaging temperature in order to restrict bacterial growth.

A still further object is to provide a method of cooking and storing food in which the cooking conditions may be closely controlled.

These and other objects will become apparent to those skilled in the art from the following summary of invention and detailed description.

SUMMARY OF INVENTION

In one aspect, the present invention is an improved method of preparing bulk-packaged food for storage comprising the steps of packaging a food product at a temperature of at least 180° F. in a flexible receptacle so that the food is flowable or mobile therein; and, tumbling said receptacle within a cooling medium maintained at a temperature below 40° F. to cause the food to move and flow within the receptacle whereby the interior temperature of the food within said receptacle is lowered below 40° F. in less than 30 minutes thereby restricting bacterial growth within said package and terminating the cooking process when desired.

In another aspect, the present invention includes storing the bulk packaged food in the temperature range of 28° F. to 32° F. after it has been quickly chilled. Chilled packages of bulk food may be stored 30 to 45 days when prepared according to the present invention. The invention also provides for tumbling the packaged food products in a heated medium to bring the food rapidly above the minimum serving temperature of 145° F. and through the temperature range of 45° F. to 145° F. where microbial growth can occur.

PREFERRED EMBODIMENTS

As used herein, "bulk food products" or "bulk packaged food" refers to packages containing more than one serving portion of food. In general, the bulk food products packaged according to the present invention may be divided into pumpable products and non-pumpable products. The pumpable products include casseroles, soups, and stews which are batch cooked prior to packaging. Non-pumpable products include fresh vegetables such as spinach, carrots, and cabbage and meat items in serving portion sizes prepared from liver, steak, beef, pork, together with their natural juices and seasonings. The non-pumpable products are generally heat processed or cooked in the casing or receptacle after packaging.

In the preferred process for pumpable products, the product is pumped out of the cooking kettle at a temperature of about 180° F. and placed into a preclipped casing or receptacle. The cooking temperature may range from about 165° F. up to the boiling point of the particular pumpable product but the preferred minimum temperature for packaging is 180° F. Also, the preferred receptacle in which the pumpable product is packaged is a preclipped casing, a casing being a seamless plastic tube which has one end closed by a metal clip and after being filled with the pumpable food product, the other end is closed with a metal clip. The preferred material for the casings is a plastic material with relatively low gas and moisture permeability.

A preferred casing material is a laminate of polyethylene/nylon/polyethylene with an ionomer resin adhesive on each side of the nylon layer. For satisfactory performance in the tumbling process said laminate should be cross-linked by irradiation to a dosage level of at least 6 MR in order to prevent delamination. Another casing material which may be used is a laminate having a fibrous layer and a saran layer.

After the food products have been pumped out of the cooking kettle and placed in the preclipped casing, air is expressed from the casing and it is clipped at its previously unclipped end. The casings are filled with 5 to 20 lbs. of the pumpable food product to make a bulk package.

The casings or pouches are sized so that even when filled with a non-pumpable product, the product is free to move within the pouch, i.e. the product should be mobile and flowable within the receptacle. When a number of 3 to 4 oz. serving portions of liver or steak are packaged, they are, with their own natural juices, quite mobile within a casing or pouch which is tumbled according to the present invention. After the package has been finally clipped, it is tumbled in water chilled to about 33° F. whereupon after about 20 minutes its temperature is reduced to below 40° F. Preferably water chilled to 33° F. to 34° F. by refrigeration or ice cooled water is used as the cooling medium for the packages and the temperature of this liquid medium may range from 33° F. to 40° F. Other liquid mediums or a gaseous medium could be used but water is the most suitable medium. The tumbling of the packages within the cooling medium is a critical feature of the invention as it allows the total contents of the package to be cooled quite rapidly thus (1) greatly speeding up production, (2) restricting microbial growth which occurs in significant proportions at temperatures about 45° F., and (3) providing close control over the cooking process so that the food does not continue to cook while being cooled as would be the case in a slower cooling process.

It has been discovered that one quite effective way of accomplishing the tumbling required by the present invention is to place filled casings in a rotating, horizontal drum having internal agitation means and an operating action similar to that of a front loading washing machine or front loading drier. The drum is preferably partially immersed in refrigerated water and tumbles the casings as it rotates. A satisfactory mechanized tumbler can be made by modifying a commercial laundry machine having a front loading door and a single revolving horizontal drum. The drive motor for such a machine is preferably modified so that the drum will rotate in the range of 8 to 12 rpm.

The rapid heat transfer from the packages could not be accomplished if the packages are rigid. The tumbling forces the food within the package to move and flow thus bringing all of the contents of the package into closer contact with the package wall of the casing which is cooled by contact with the liquid medium. In addition, the package while being tumbled constantly changes its shape and, in general, remains somewhat flat thus reducing the length of the path along which heat is transferred out of or into the package.

The tumbling of the casings with the resultant internal movement of the packaged food performs an additional step in the cooling process which contributes significantly to the improved cooling rate. That step is the prevention of the accumulation of any solidified fats on the interior walls of the casings which would hamper the transfer of heat through the walls. For example, if a casing is placed in a cooling medium after having been filled with hot food, the fats in the food will solidify on the casing wall as the wall becomes chilled by the cooling medium. This layer of solidified fat acts as an insulating barrier against the flow of heat from the interior of the package and even after a number of hours the food in the interior of the package will be warm while the wall of the receptacle is cold. Tumbling, and agitating the contents of the package prevents the buildup of solidified food on the receptacle wall.

While mechanized tumbling is a preferred and labor saving means of carrying out the present invention, the filled casing may also be manually tumbled or agitated within a cooling medium to cause the contents thereof to move and flow thereby achieving the desired quick reduction in internal temperature.

After the packages have been rapidly cooled as described above, they may be stored in the temperature range at 28° F. to 32° F. for a period of 30 to 45 days which is a significant increase in the storage time for unfrozen cooked foods. This increased storage lifetime can be attributed to the quick cooling that results in restriction of microbial growth and prevents autolytic changes in the product.

After storage, the packages may be reheated to serving temperatures by tumbling for approximately 20 minutes in a medium heated to about 185° F. This will increase the product interior temperature to approximately 155° F. or more. If conventional heating methods are used as simply dropping the packages in heated water a minimum reheating time of 90 minutes is required.

The non-pumpable products packaged by the process of the present invention include fresh vegetables and meat items which are heat processed after being packaged. Thus, the uncooked food is placed in a preclipped casing, the air is removed from the casing, and then finally clipped. Afterwards, the casings are tumbled in 145° to 200° water for time periods ranging from 10 to 90 minutes depending on the product. For vegetables, the preferred water temperature is approximately 185° F. and the casings will be tumbled between 10 to 30 minutes depending on the particular vegetable. For meats, the preferred water temperature is again about 185° F. and the tumbling time runs between 25 to 90 minutes depending on the particular product. After the cooking process has been completed, the products are immediately placed within a liquid medium and tumbled to quickly bring the interior temperature and consequently the total temperature of the food item to below 40° F. in less than about 30 minutes. This stops the cooking process, prevents overprocessing, and restricts bacterial growth. The liquid medium may be refrigerated water or ice cooled water. As with the pumpable products, the food items may be stored at 28 to 32° F. for 30 to 45 days; and when it is desirable to serve the food it may be again reheated by tumbling in hot water to raise its temperature to at least 145° F. and then serving.

EXAMPLE I

In order to demonstrate the safety and feasibility of cooling and storing unfrozen food in flexible receptacles, thirty packages each of macaroni and cheese, pea soup, Mexican rice, and beef stew were prepared by filling casings at 180° F. which is a temperature above that at which most microorganisms will survive. The filled casings were batch cooled with agitation in refrigerated water until the internal temperature of the casings was 40° F. or less, the point in this Example being to demonstrate that once the sub-40° F. temperature was reached the food could be safely stored without loss of edibility rather than to quickly cool the food. Four of the thirty packages were frozen immediately after cooling and the remainder were placed in storage at 30° F. At weekly intervals, for four weeks, four packages were removed from storage and frozen for microbial analysis and one package was reconstituted for organoleptic evaluation. The packages were shipped in the frozen state to a bacteriological laboratory for analysis in which four 1 gram samples were taken from each package. In 336 samples taken, no pathogenic or public health indicator organisms were detected. Ninety-five percent of the samples had a total count of less than 1000 organisms per gram. (A total count of less than 1000 organisms per gram is associated with pasteurized products.)

EXAMPLE II

Three batches of chicken-a-la-king were prepared for institutional feeding. Casings were filled with the food product and then clipped and placed in a rotating drum as described above which is partially immersed in 50 gallons of recirculating refrigerated water supplied at 32° F. The filled casings were tumbled so that the food product moved and flowed within the casings. The test results are set forth below:

(1) Batch #1.
 Number of casings=23
 Average weight/casing=9½ lbs.
 Product temperature at time of loading=180° F.
 All 23 casings were cooled to 40° F. in 19 minutes.

(2) Batch #2.
 Number of casings=23
 Average weight/casing=8 lbs. 9 oz.
 Product temperature at time of loading=185° F.

| Elapsed Time | Water Temp. | Product Temp. |
| --- | --- | --- |
| 5 min. | 38° F. | 56° |
| 15 min. | 35° | 46° |
| 20 min. | 34° | 40° |

(3) Batch #3.
 Number of casings=25
 Average weight/casing=8 lbs. 13 oz.
 Product temperature at time of loading=180° F.

| Elapsed Time | Water Temp. | Product Temp. |
| --- | --- | --- |
| 5 min. | 44° F. | 64° |
| 15 min. | 36° | 46° |
| 20 min. | 34° | 40° |

EXAMPLE III

Twenty-eight casings filled with beef stew were removed from cold storage to be reheated. Water heated with steam was the heating medium and it was heated from its initial temperature of 158° F.–160° F. after the casings were placed therein to its final temperature of 184° F.–190° F. Approximately 20 gallons of water was used. The casings were tumbled in the heated water as described hereinabove. The results are set forth below:

| | Batch #1 | Batch #2 |
| --- | --- | --- |
| Number of casings: | 8 | 20 |
| Total product weight: | 87 lbs. | 217 lbs. |
| Product temp. at time of load: | 40° F. | 40° F. |
| Water temp. at time of load: | 160° | 158° |
| Final temp. of water: | 184° | 190° |
| Final temp. of product: | 170° | 162° |
| Total reheat time: | 18 min. | 11 min. |

EXAMPLE IV

Food products which had been packaged in casings and cooled by tumbling according to the present invention and then stored at 28° to 32° F. were removed from storage and reconstituted in 350° F. convection ovens. The product temperature at the time of being placed in the ovens was 30° F. The results are set forth below:

| Food Product | Storage Time | Weight | Heating Time | Evaluation |
| --- | --- | --- | --- | --- |
| Beef noodle soup | 48 days | 8½ lbs. | 45 min. | Good aroma and texture. Appearance acceptable. |
| Spaghetti in tomato sauce | 47 days | 9½ lbs. | 45 min. | Good aroma and texture. Appearance acceptable |
| Potato and onion soup | 43 days | 8½ lbs. | 45 min. | Good aroma and texture. Appearance acceptable. |
| Ham and Potato Casserole | 22 days | 10¼ lbs. | 45 min. | Good aroma and texture. Appearance acceptable. |

The foregoing examples demonstrate that quick cooling and heating of bulk packaged food items is achieved by the present invention, that packaged food items may be safely stored for extended periods and retain their aroma, texture and appearance, and that a significant saving of time may be realized in the production process for bulk packaged food.

We Claim:

1. An improved method of preparing food products for chilled unfrozen storage comprising the steps of:
 (a) providing a food product with a minimum temperature of 180° F., said food product having a tendency to solidify upon cooling from 180° F. to below 40° F. but above its freezing temperature;
 (b) providing a flexible receptacle having low gas and moisture permeability;
 (c) filling said receptacle with a quantity of food product at said minimum temperature so that said food product is mobile within said receptacle and the walls of the filled receptacle remain flexible and the receptacle can freely change shape;
 (d) closing said receptacle;
 (e) placing said receptacle in a cooling medium maintained at less than 40° F. said receptacle not being connected to any other receptacle in the cooling medium and said receptacle being free to move within the medium independently of other receptacles; and,
 (f) tumbling said receptacle within said cooling medium to cause the receptacle to flex and change its shape and the food product to move within the receptacle to such an extent sufficient to reduce the temperature of the food from the 180° F. to less than 40° F. but above its freezing temperature in less than 30 minutes consequently restricting microbial growth within said food product and to prevent the accumulation of any solidified fats, derived from the food product, on the interior walls of the receptacle.

2. The method of claim 1 wherein said flexible receptacle is a laminated thermoplastic casing, said laminated casing having been irradiated to a dosage of at least 6 MR whereby the thermoplastic materials of the casing are cross-linked by irradiation to prevent delamination.

3. The method of claim 1 wherein said cooling medium is water cooled to the temperature range of 32° F. to 40° F.

4. The method of claim 1 including the step of storing the receptacle containing the chilled food product at a temperature in the range of 28° F. to 32° F.

5. The method of claim 4 including the steps of providing a rotatable, horizontal drum partially submerged in said chilled water and tumbling said receptacle in said water by placing the receptacle in said drum and rotating same.

6. The method of claim 1 including the step of cooking said food product prior to placing it in the cooling medium and, after storing said cooled receptacle, the step of tumbling said receptacle in heated water for less than 30 minutes to bring the food product to serving temperature.

* * * * *